US008072533B2

(12) United States Patent
Wang et al.

(10) Patent No.: US 8,072,533 B2
(45) Date of Patent: Dec. 6, 2011

(54) CONDUCTIVE HOLDER FOR FLASH AND FLASH ASSEMBLY HAVING SAME

(75) Inventors: Shu-Fan Wang, Taipei Hsien (TW); Heng-Hsin Huang, Taipei Hsien (TW)

(73) Assignee: Hon Hai Precision Industry Co., Ltd., Tu-Cheng, New Taipei (TW)

( * ) Notice: Subject to any disclaimer, the term of this patent is extended or adjusted under 35 U.S.C. 154(b) by 331 days.

(21) Appl. No.: 12/429,146

(22) Filed: Apr. 23, 2009

(65) Prior Publication Data
US 2010/0118178 A1    May 13, 2010

(30) Foreign Application Priority Data

Nov. 10, 2008    (CN) .......................... 2008 1 0305459

(51) Int. Cl.
*H04N 5/222* (2006.01)
*H04N 5/225* (2006.01)
*G03B 15/03* (2006.01)

(52) U.S. Cl. .......... 348/371; 348/373; 396/176
(58) Field of Classification Search ........ 348/370, 348/371, 375, 373, 374; 396/176–178, 106
See application file for complete search history.

(56) References Cited

U.S. PATENT DOCUMENTS

| 5,768,641 | A | * | 6/1998 | Sato ........................ 396/317 |
| 5,884,104 | A | * | 3/1999 | Chase et al. ............... 396/176 |
| 5,999,751 | A | * | 12/1999 | Imamura et al. .......... 396/200 |
| 2010/0061075 | A1 | | 3/2010 | Huang et al. |

* cited by examiner

*Primary Examiner* — Nhan T Tran
(74) *Attorney, Agent, or Firm* — Altis Law Group, Inc.

(57) ABSTRACT

A conductive holder for a flash comprises a base, an elastic first holding arm, and an elastic second holding arm. The base includes a first end and an opposite second end. The first holding arm extends from the first end. The second holding arm extends from the second end and faces the first holding arm. The first holding arm and the second holding arm cooperatively forms a gap for firmly holding the flash.

10 Claims, 2 Drawing Sheets

CONDUCTIVE HOLDER FOR FLASH AND FLASH ASSEMBLY HAVING SAME

BACKGROUND

1. Technical Field

The disclosure relates to installation technology and, particularly, to a conductive holder for a flash and a flash assembly having the same.

2. Description of Related Art

Portable electronic devices, such as digital cameras, and cell phones equipped with a camera module, typically employ a flash assembly to illuminate an object in a dark environment. Generally, the flash assembly includes a flash and a circuit board. The flash includes two electrodes electrically connected to the circuit board by wires and an additional holder for fixing the flash to the circuit board. However, this configuration challenges a portability of the portable electronic device.

Therefore, what is needed is a conductive holder for the flash and a flash assembly having the same which can overcome the above-mentioned problem.

DETAILED DESCRIPTION

Figure 1:
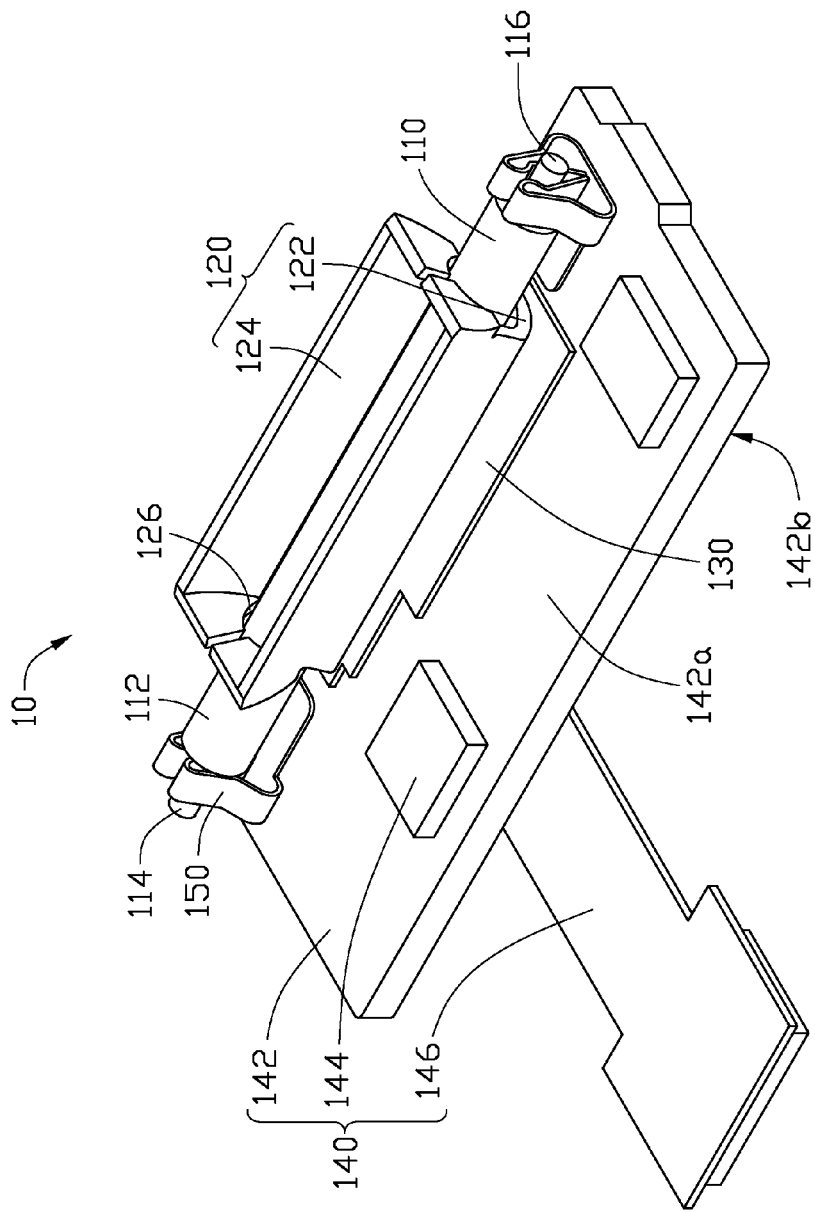
FIG. 1 is an isometric view of a flash assembly including a conductive holder, according to an exemplary embodiment.

Referring to FIG. 1, a flash assembly 10 includes a flash 110, a reflector 120, a trigger electrode 130, a circuit board unit 140, and two conductive holders 150. The flash 110 extends through the reflector 120 and is fixed to the circuit board unit 140 by the conductive holders 150. The trigger electrode 130 electrically connects the reflector 120 to the circuit board unit 140.

The flash 110 includes a tube 112 and two electrodes 114, 116, such as an anode 114 and a cathode 116, protruding outwardly from opposite ends of the tube 112. The tube 112, the anode 114, and the cathode 116 are cylindrical. A transparent conducting film (not shown) is coated on the tube 112 for electrically connecting the flash 110 to the reflector 120. The diameter of the anode 114 and the cathode 116 are less than that of the tube 112. The tube 112 may be filled with noble gas, such as xenon gas, krypton gas, and argon gas etc, and be configured to create a bright light when energized by a high voltage pulse. In this embodiment, the tube 112 is filled with xenon gas.

The reflector 120 is approximately semi-cylinder-shaped and includes a curved supporting portion 122 and a reflective portion 124 radially extending from the supporting portion 122. Two through holes 126 are defined in two opposite sidewalls of the reflective portion 124. The flash 110 extends through the two through holes 126 and is supported by the supporting portion 122. The reflective portion 124 is coated with a reflective film (not shown) inside, and is configured for reflecting light beams generated by the tube 112 radially along the direction of the reflective portion 124. The trigger electrode 130 is attached to the supporting portion 122 outside the reflector 120 and is configured for ionizing the gas inside the tube 112.

The circuit board unit 140 includes a circuit board 142, a number of electronic components 144, and a flexible printed circuit board (FPCB) 146. The circuit board 142 includes a first surface 142a and a second surface 142b opposite to the first surface 142a. The plurality of electronic components 144 may include resistors, capacitors, and other components. The electronic components 144 are electrically disposed on the first surface 142a of the circuit board 142. The FPCB 146 is electrically disposed on the second surface 142b of the circuit board 142 and configured for electrically connecting the circuit board 142 and the electronic component 144 to a portable electronic device (not shown).

Figure 2:
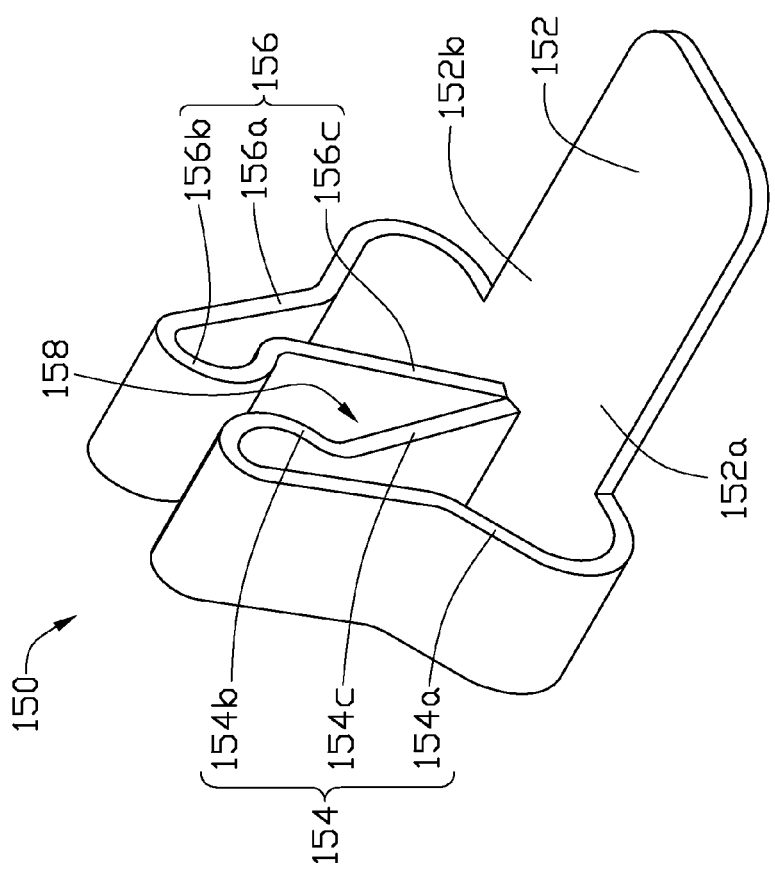
FIG. 2 is an isometric schematic view of the conductive holder of FIG. 1.

Referring to FIGS. 1 and 2, the conductive holders 150 are fixed to the first surface 142a of the circuit board 142 by welding, and are made from an elastic, and conductive metal, such as beryllium or copper. Each conductive holder 150 includes a base 152, a first holding arm 154, and a second holding arm 156.

The base 152 includes a first end 152a and an opposite second end 152b. The first holding arm 154 and the second holding arm 156 extend from the two opposite ends 152a, 152b of the base 152, respectively.

The first holding arm 154 is approximately R-shaped, and includes a first connecting portion 154a, a first retaining portion 154b, and a first supporting portion 154c. One end of the first connecting portion 154a is connected to the base 152, and the other end of the first connecting portion 154a is connected to one end of the first retaining portion 154b. The other end of the first retaining portion 154b is connected to one end of the first retaining portion 154c.

The second holding arm 156 is approximately mirror-image-of-R-shaped, and includes a second connecting portion 156a, a second retaining portion 156b, and a second supporting portion 156c. One end of the second connecting portion 156a is connected to the base 152, and the other end of the second connecting portion 156a is connected to one end of the second retaining portion 156b. The other end of the second retaining portion 156b is connected to one end of the second retaining portion 156c.

The first holding arm 154 and the second holding arm 156 cooperatively form a gap 158 therebetween. A maximum width of the gap 158 is smaller than the diameter of the anode 114 and the cathode 116. The anode 114 and the cathode 116 are received in two gaps 158 of the two conductive holders 150, respectively. The first retaining portion 154b faces the second retaining portion 156b to cooperatively retain the flash 110, and the first supporting portion 154c faces the second supporting portion 156c to cooperatively support the flash 110, thereby the flash 110 being fixedly held by the two conductive holders 150. Therefore, conductivity of the flash 110 and the circuit board unit 140 can be firmly established and no additional holder is needed.

It is to be understood, however, that even though numerous characteristics and advantages of the present embodiments have been set fourth in the foregoing description, together with details of the structures and functions of the embodiments, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A conductive holder for a flash, comprising:
a base comprising a first end and an opposite second end;
an elastic first holding arm extending from the first end, the first holding arm comprising a first connecting portion, a first retaining portion, and a first supporting portion, wherein the first connecting portion extending from the base, the first connecting portion, the first retaining portion and the first supporting portion being connected in sequence; and an elastic second holding arm extending from the second end and facing the first holding arm, the second holding arm comprising a second connecting portion, a second retaining portion, and a second supporting portion, the second connecting portion extending from the base, wherein the second connecting portion, the second retaining portion, and the second supporting portion are connected in sequence, and wherein the first retaining portion, the second retaining portion, the first supporting portion, and the second supporting portion are positioned between the first connecting portion and the second connecting portion, distal ends of the first supporting portion and the second supporting portion face towards the base, the first retaining portion, the second retaining portion, the first supporting portion, and the second supporting portion cooperatively form a gap for firmly holding the flash, and wherein the flash comprises a tube, an anode and a cathode protrude outwardly from opposite ends of the tube, wherein the maximum width of the gap is smaller than the diameter of the anode and the cathode, either of the anode and the cathode is able to be held by the gap, and a transparent conducting film is coated on the tube for electrically connecting the flash to a reflector.

2. The conductive holder as claimed in claim 1, wherein the first retaining portion faces the second retaining portion to cooperatively retain the flash, and the first supporting portion faces the second supporting portion to cooperatively support the flash.

3. The conductive holder as claimed in claim 1, wherein the conductive holder is made from an elastic and conductive metal.

4. The conductive holder as claimed in claim 3, wherein the metal is beryllium or copper.

5. The conductive holder as claimed in claim 1, wherein the first holding arm is approximately R-shaped, and the second holding arm is approximately mirror-image-of-R-shaped.

6. A flash assembly comprising:
a circuit board unit comprising a circuit board;
a trigger electrode electrically positioned on the circuit board;
a reflector electrically mounted on the trigger electrode;
a flash comprising an anode and a cathode, the flash extending through the reflector, the anode and the cathode positioned outside the reflector; and
two conductive holders fixed on the circuit board, each conductive holder comprising:
a base comprising a first end and an opposite second end;
an elastic first holding arm extending from the first end, the first holding arm comprising a first connecting portion, a first retaining portion, and a first supporting portion, the first connecting portion extending from the base, wherein the first connecting portion, the first retaining portion and the first supporting portion are connected in sequence; and
an elastic second holding arm extending from the second end and facing the first holding arm, the second holding arm comprising a second connecting portion, a second retaining portion, and a second supporting portion, wherein the second connecting portion extending from the base, the second connecting portion, the second retaining portion, and the second supporting portion are connected in sequence, and
wherein the first retaining portion, the second retaining portion, the first supporting portion, and the second supporting portion are positioned between the first connecting portion and the second connecting portion, distal ends of the first supporting portion and the second supporting portion face towards the base, the first retaining portion, the second retaining portion, the first supporting portion, and the second supporting portion cooperatively form a gap for firmly holding one of the anode or the cathode of the flash, and
wherein the anode and cathode protruding outwardly from opposite ends of the tube, wherein the maximum width of the gap is smaller than the diameter of the anode and the cathode, either of the anode and the cathode is able to be held by the gap, and a transparent conducting film is coated on a tube of the flash for electrically connecting the flash to a reflector.

7. The flash assembly as claimed in claim 6, wherein the first retaining portion faces the second retaining portion to cooperatively retain the flash, and the first supporting portion faces the second supporting portion to cooperatively support the flash.

8. The flash assembly as claimed in claim 6, wherein the conductive holder is made from an elastic and conductive metal.

9. The flash assembly as claimed in claim 8, wherein the metal is beryllium or copper.

10. The flash assembly as claimed in claim 6, wherein the first holding arm is approximately R-shaped, and the second holding arm is approximately mirror-image-of-R-shaped.

* * * * *